(No Model.)

M. S. PIERCE, L. H. DESISLE & O. C. OLIVER.
AUTOMATIC ELECTRIC HEAT ALARM.

No. 466,865. Patented Jan. 12, 1892.

Witnesses

Inventors:
Morrill Scott Pierce
Leonard Herbert Desisle
Orville C. Oliver

UNITED STATES PATENT OFFICE.

MORRILL SCOTT PIERCE, OF WESTPORT, LEONARD H. DESISLE, OF LAMOINE, AND ORVILLE C. OLIVER, OF EDEN, ASSIGNORS TO THE ELECTRIC HEAT ALARM COMPANY, OF BANGOR, MAINE.

AUTOMATIC ELECTRIC HEAT-ALARM.

SPECIFICATION forming part of Letters Patent No. 466,865, dated January 12, 1892.

Application filed December 16, 1890. Serial No. 374,852. (No model.)

*To all whom it may concern:*

Be it known that we, MORRILL SCOTT PIERCE, of Westport, Lincoln county, LEONARD H. DESISLE, of Lamoine, Hancock county, and ORVILLE C. OLIVER, of Eden, Hancock county, Maine, all citizens of the United States, residing in the State of Maine, have invented a new and useful Automatic Electric Heat-Alarm, of which the following is a specification.

The invention is for use in connection with journals and other machines and parts of machines where injury is liable to be occasioned by overheating, (through friction or other causes,) and is designed to give an alarm automatically when heat begins to be excessive, thus avoiding and preventing damage which would otherwise be caused. We obtain these objects by the mechanism illustrated in the accompanying drawings, in which—

Figure 3:
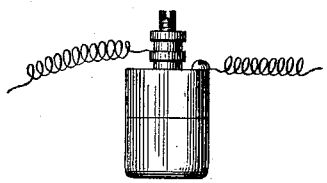
Figure 2:
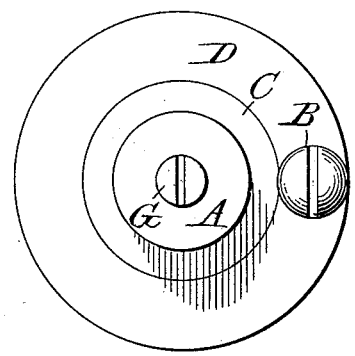
Figure 1:
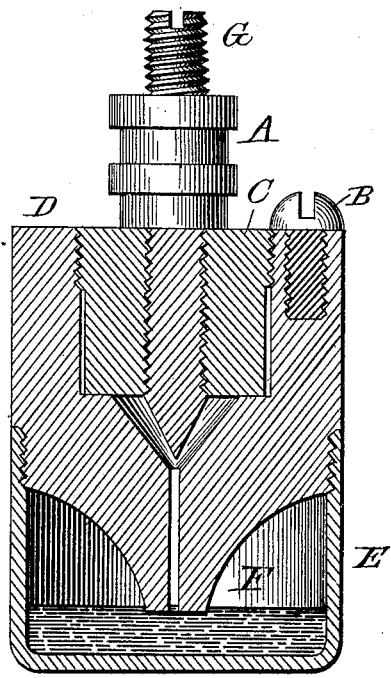

Figure 1 is a vertical section of nut A and screw-head B in elevation; Fig. 2, a plan view, and Fig. 3 an elevation, of the whole device.

In the following detailed description similar letters refer to similar parts throughout the several views.

The device consists of a metallic cylinder made up of two sections, a lower section E, which is closed and solid at one end and open at the other, with an inside thread at the open end, and an upper section D, fitted with a shoulder and outside thread, so as to screw into the first section as a plug forming one cylinder. Extending from this shoulder is a projection shaped like the frustum of a cone, of such length that when the two sections are screwed together it reaches very nearly to the bottom of the lower section. A small bore through this projection connects the hollow parts of the two sections. Within the upper section a hard-rubber non-conductor C is fitted, through which a metallic spindle G passes, connecting at its outer end G with one of the poles of an electric battery. The other battery connection is a set-screw in the upper section B. A nut A holds the spindle in position.

In operation the first section is partly filled with mercury F, the two sections screwed together, and the device fixed into the journal box or bearing of the machine. Excessive heat causes expansion of the mercury, and forcing it through the bore connecting the two sections brings it in contact with the spindle, thus completing an electric circuit and giving an alarm by means of a common electric bell.

We claim as our joint invention and ask to be secured by Letters Patent—

An electric heat-alarm consisting of the combination of a hollow metallic reservoir, a quantity of mercury within said reservoir, a metallic plug partially filling said reservoir and having a small downwardly-extending tubular bore, a conductor-wire or wire spindle supported and insulated within said plug and extending to such point as that it may be reached by said mercury when expanded and rises in said tube, the whole in combination with an electric battery having one of its poles connected with said plug and the other with said insulated conductor wire or spindle, and a bell or other alarm or indicator connected with and operated by said electric battery.

MORRILL SCOTT PIERCE.
LEONARD H. DESISLE.
ORVILLE C. OLIVER.

Witnesses:
L. B. DEASY,
JNO. T. HIGGINS.